(12) United States Patent
Shimada et al.

(10) Patent No.: US 10,960,879 B2
(45) Date of Patent: Mar. 30, 2021

(54) VEHICLE CONTROL SYSTEM, VEHICLE CONTROL METHOD, AND VEHICLE CONTROL PROGRAM

(71) Applicant: HONDA MOTOR CO., LTD, Tokyo (JP)

(72) Inventors: Masahiko Shimada, Haga-gun (JP); Yoshitaka Mimura, Utsunomiya (JP); Toshiyuki Kaji, Saitama (JP); Mahito Shikama, Utsunomiya (JP); Masanori Takeda, Tokyo (JP); Kentaro Ishisaka, Utsunomiya (JP)

(73) Assignee: HONDA MOTOR CO., LTD., Tokyo (JP)

(*) Notice: Subject to any disclaimer, the term of this patent is extended or adjusted under 35 U.S.C. 154(b) by 371 days.

(21) Appl. No.: 15/801,413

(22) Filed: Nov. 2, 2017

(65) Prior Publication Data
US 2018/0126990 A1    May 10, 2018

(30) Foreign Application Priority Data
Nov. 7, 2016 (JP) .............................. JP2016-217413

(51) Int. Cl.
*B60W 30/16* (2020.01)
*B60W 30/12* (2020.01)
(Continued)

(52) U.S. Cl.
CPC .......... *B60W 30/162* (2013.01); *B60W 10/04* (2013.01); *B60W 10/18* (2013.01);
(Continued)

(58) Field of Classification Search
CPC .... B60W 30/162; B60W 30/16; B60W 30/12; B60W 50/082; B60W 10/04; B60W 10/18; B60W 10/20; B60W 30/09; B60W 30/0956; B60W 30/18163; B60W 50/085; B60W 50/14; B60W 2540/215; B60W 2552/05; B60W 2554/801; B60W 2554/804; B60W 2554/4041; B60W 2754/10; B60W 2754/30; B60W 2754/50; B60W 2050/0095; B60W 2050/146;
(Continued)

(56) References Cited

U.S. PATENT DOCUMENTS

2018/0095608 A1* 4/2018 Jablonski ............... B60K 35/00
2018/0113474 A1* 4/2018 Koda ....................... G08G 1/09

FOREIGN PATENT DOCUMENTS

CN    104105614    10/2014
CN    104203629    12/2014
(Continued)

OTHER PUBLICATIONS

Japanese Office Action for Japanese Patent Application No. 2016-217413 dated Jun. 26, 2018.
(Continued)

*Primary Examiner* — Adam R Mott
(74) *Attorney, Agent, or Firm* — Amin, Turocy & Watson, LLP

(57) ABSTRACT

A vehicle control system includes: a first switch that accepts an operation of an occupant of a vehicle; and a performance part that performs, when the first switch is operated, travel assist in a node in which an assist degree is the largest at that time point.

10 Claims, 9 Drawing Sheets

(51) Int. Cl.
  *B60W 50/08*   (2020.01)
  *B60W 10/04*   (2006.01)
  *B60W 10/18*   (2012.01)
  *B60W 10/20*   (2006.01)
  *B60W 30/09*   (2012.01)
  *B60W 30/095*  (2012.01)
  *B60W 30/18*   (2012.01)
  *B60W 50/14*   (2020.01)
  *G08G 1/16*    (2006.01)
  *B60W 50/00*   (2006.01)

(52) U.S. Cl.
  CPC ............ *B60W 10/20* (2013.01); *B60W 30/09* (2013.01); *B60W 30/0956* (2013.01); *B60W 30/12* (2013.01); *B60W 30/16* (2013.01); *B60W 30/18163* (2013.01); *B60W 50/082* (2013.01); *B60W 50/085* (2013.01); *B60W 50/14* (2013.01); *G08G 1/162* (2013.01); *B60K 2310/248* (2013.01); *B60K 2310/268* (2013.01); *B60W 2050/0095* (2013.01); *B60W 2050/146* (2013.01); *B60W 2420/42* (2013.01); *B60W 2420/52* (2013.01); *B60W 2520/105* (2013.01); *B60W 2520/125* (2013.01); *B60W 2520/14* (2013.01); *B60W 2540/215* (2020.02); *B60W 2552/05* (2020.02); *B60W 2554/4041* (2020.02); *B60W 2554/801* (2020.02); *B60W 2554/804* (2020.02); *B60W 2710/18* (2013.01); *B60W 2710/20* (2013.01); *B60W 2720/106* (2013.01); *B60W 2720/125* (2013.01); *B60W 2754/10* (2020.02); *B60W 2754/30* (2020.02); *B60W 2754/50* (2020.02); *G08G 1/163* (2013.01); *G08G 1/166* (2013.01); *G08G 1/167* (2013.01)

(58) Field of Classification Search
  CPC ......... B60W 2420/42; B60W 2420/52; B60W 2520/105; B60W 2520/125; B60W 2520/14; B60W 2710/18; B60W 2710/20; B60W 2720/106; B60W 2720/125; G08G 1/162; G08G 1/163; G08G 1/166; G08G 1/167; B60K 2310/268; B60K 2310/248; G05D 1/0223; G05D 2201/0212
  See application file for complete search history.

(56) References Cited

FOREIGN PATENT DOCUMENTS

| | | |
|---|---|---|
| CN | 104661888 | 5/2015 |
| JP | 2007-022285 | 2/2007 |
| JP | 104105614 | 10/2014 |
| JP | 104203629 | 12/2014 |
| JP | 104661888 | 5/2015 |
| JP | 2015-141051 | 8/2015 |
| JP | 2015-206655 | 11/2015 |
| JP | 2016-049933 | 4/2016 |
| JP | 2016-095627 | 5/2016 |
| WO | 2016/052507 | 4/2016 |
| WO | 2016/152874 | 9/2016 |

OTHER PUBLICATIONS

Japanese Notice of Allowance for Japanese Patent Application No. 2016-217413 dated Oct. 2, 2018.
Chinese Office Action for Chinese Patent Application No. 201711069284.X dated Jun. 2, 2020.

* cited by examiner

| ITEM | SET CONTENT | ... |
|---|---|---|
| SET SPEED | 100km/h | ... |
| SET INTER-VEHICLE DISTANCE | 50m | ... |
| ... | ... | ... |

VEHICLE CONTROL SYSTEM, VEHICLE CONTROL METHOD, AND VEHICLE CONTROL PROGRAM

CROSS-REFERENCE TO RELATED APPLICATION

Priority is claimed on Japanese Patent Application No. 2016-217413, filed on Nov. 7, 2016, the contents of which are incorporated herein by reference.

BACKGROUND

Field of the Invention

The present invention relates to a vehicle control system, a vehicle control method, and a vehicle control program.

Background

In the related art, research has been conducted on techniques that cause a vehicle to travel according to automated driving along a travel route for arriving at a destination. In relation to this, techniques have been disclosed in which a switch switched by a user between performing an automated driving control in an automated driving zone and performing manual driving without performing an automated driving control is provided, and based on the switch operation, a vehicle travel control is performed (for example, refer to Japanese Patent Application, Publication No. 2015-141051A).

SUMMARY

However, in the related art, it is necessary to provide a switch for each function relating to a driving control such as a switch for switching between automated driving and manual driving and a travel assist switch for setting a vehicle speed during manual driving, setting an inter-vehicle distance with a frontward traveling vehicle, or the like. Therefore, the number of switches is increased, and there is a possibility that the operation becomes difficult.

An object of an aspect of the present invention is to provide a vehicle control system, a vehicle control method, and a vehicle control program in which an operation relating to travel assist can be easily performed.

(1) A vehicle control system according to an aspect of the present invention includes: a first switch that accepts an operation of an occupant of a vehicle; and a performance part that performs, when the first switch is operated, travel assist in a mode in which an assist degree is the largest at that time point.

(2) In the above vehicle control system, the performance part may include: an automated driving control unit that performs automated driving in which at least one of acceleration deceleration and steering of the vehicle is automatically controlled; a travel assist control unit that performs travel assist in which a degree of travel assist is lower than that of the automated driving; and a switching unit that switches between the automated driving and the travel assist, wherein when accepting an operation of the first switch by the occupant and when automated driving of the vehicle is available, the switching unit may perform automated driving of the vehicle by the automated driving control unit, and wherein when accepting an operation of the first switch by the occupant and when the automated driving is not available, the switching unit may perform travel assist of the vehicle by the travel assist control unit.

(3) In the above vehicle control system, when accepting an operation of the first switch in a state where travel assist by the travel assist control unit is performable, the performance part may set a current travel speed of the vehicle as a set speed of the vehicle in the travel assist, and when accepting an operation of the first switch again after a predetermined cancel operation is performed, the performance part may cause a travel speed of the vehicle in the travel assist to return to the set speed.

(4) In the above vehicle control system, when a predetermined period of time has elapsed since it becomes possible to cause a travel speed of the vehicle in the travel assist to return to the set speed, or when the vehicle moves to a road of a different class from a road on which the vehicle is currently traveling, the performance part may cause returning to the set speed when accepting an operation of the first switch to be unavailable.

(5) The above vehicle control system may further include a second switch that accepts an operation of the occupant relating to a change of a set speed of the vehicle, wherein the travel assist control unit may change a set speed in the travel assist based on an operation to the second switch while performing travel assist of the vehicle and may cause the set speed to return to a set speed before the change when a predetermined cancel operation is performed.

(6) In the above vehicle control system, the predetermined cancel operation may be an operation in which an operation in an acceleration direction to the second switch is performed, and an operation in a deceleration direction to the second switch is performed before the operation in the acceleration direction is fixed.

(7) In the above vehicle control system, when a predetermined period of time has elapsed since the travel assist control unit accepts an operation of changing the set speed by the second switch, or when the vehicle performs lane change while accepting an operation of changing the set speed by the second switch, the travel assist control unit may determine that the predetermined cancel operation is performed and may cause the set speed to return to a set speed before the change.

(8) In the above vehicle control system, when it is determined that the predetermined cancel operation is performed while performing travel assist that causes a speed of the vehicle to return to the set speed, the travel assist control unit may cancel the travel assist that causes the speed of the vehicle to return to the set speed.

(9) In the above vehicle control system, the travel assist control unit may change a change width of the set speed based on a movement amount of the second switch.

(10) In the above vehicle control system, the second switch may include a toggle switch.

(11) The above vehicle control system may further include an interface part that presents information relating to automated driving or travel assist of the vehicle.

(12) Another aspect of the present invention is a vehicle control method, by way of an in-vehicle computer, comprising: accepting an operation of an occupant of a vehicle by a first switch; and performing, when the first switch is operated, travel assist in a mode in which an assist degree is the largest at that time point.

(13) Still another aspect of the present invention is a non-transitory computer-readable recording medium including a vehicle control program that causes an in-vehicle computer to: accept an operation of an occupant of a vehicle by a first switch; and perform, when the first switch is operated, travel assist in a mode in which an assist degree is the largest at that time point.

According to the configurations (1), (12), and (13) described above, the vehicle control system can allow the occupant to easily perform the operation relating to the travel assist.

According to the configuration (2) described above, the vehicle control system can switch between the automated driving and the travel assist only by the switch operation of the occupant and can perform a travel control that allows priority to the automated driving.

According to the configuration (3) described above, using the first switch, the occupant can promptly perform setting of the set speed, returning to the set speed, and the like in a state where the travel assist is performable, by a simple operation.

According to the configuration (4) described above, the vehicle control system can clear the set speed using the first switch at an appropriate timing, and therefore, it is possible to prevent the set speed from being cleared unintendedly by the occupant.

According to the configurations (5) to (8) described above, the vehicle control system can perform the cancel operation to the change of the set speed in response to the operation content or the operation timing of the second switch. Accordingly, the occupant can easily perform the operations of changing the set speed and returning to the set speed before the change using the second switch.

According to the configuration (9) described above, the occupant can promptly change the set speed to a target set speed by a simple switch operation.

According to the configuration (10) described above, it becomes easier for the occupant to visually recognize the movement amount of the second switch compared to a seesaw switch. Accordingly, the occupant can change the set speed of the vehicle by an intended change width.

According to the configuration (11) described above, the occupant can easily understand the degree of the travel assist of the vehicle by the interface part.

BRIEF DESCRIPTION OF THE DRAWINGS

FIG. 4 is a view showing an example of a set information table.

DESCRIPTION OF THE EMBODIMENTS

Hereinafter, a vehicle control system, a vehicle control method, and a vehicle control program according to an embodiment of the present invention will be described with reference to the drawings.

[Entire Configuration]

Figure 1:
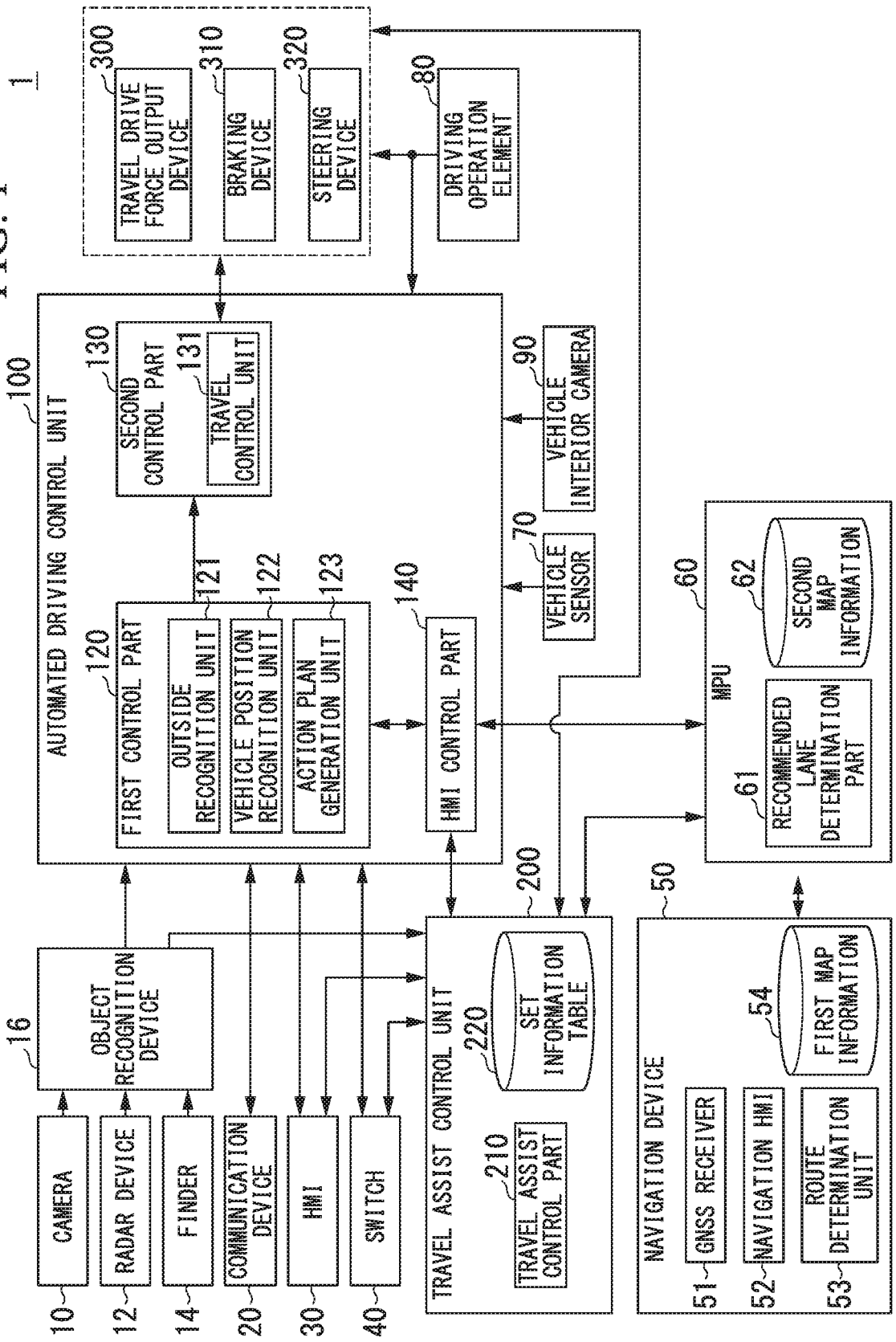
FIG. 1 is a configuration view of a vehicle system in an embodiment.

FIG. 1 is a configuration view of a vehicle system 1 in an embodiment. A vehicle on which the vehicle system 1 is provided is, for example, a vehicle having two wheels, three wheels, four wheels, or the like. A drive source of the vehicle on which the vehicle system 1 is provided is an internal combustion engine such as a diesel engine and a gasoline engine, an electric motor, or the combination of the internal combustion engine and the electric motor. The electric motor is operated by using generated electric power by a generator connected to the internal combustion engine or discharged electric power of a secondary battery or a fuel cell.

The vehicle system 1 includes, for example, a camera 10, a radar device 12, a finder 14, an object recognition device 16, a communication device 20, a HMI (Human Machine Interface) 30, a switch 40, a navigation device 50, a MPU (Micro-Processing Unit) 60, a vehicle sensor 70, a driving operation element 80, a vehicle interior camera 90, an automated driving control unit 100, a travel assist control unit 200, a travel drive force output device 300, a braking device 310, and a steering device 320. These devices and equipment are mutually connected by a multiplex communication line such as a CAN (Controller Area Network) communication line, a serial communication line, a wireless communication network, and the like. The configuration shown in FIG. 1 is just an example; part of the configuration may be omitted, and another configuration may be further added.

In the embodiment, a "vehicle control system" includes, for example, the HMI 30, the switch 40, the automated driving control unit 100, and the travel assist control unit 200. The HMI 30 is an example of an "interface part".

The camera 10 is, for example, a digital camera that uses a solid-state imaging element such as a CCD (Charge-Coupled Device) or a CMOS (Complementary Metal Oxide Semiconductor). One or more cameras 10 are attached to an arbitrary part of the vehicle (hereinafter, referred to as a "vehicle M") on which the vehicle system 1 is provided. When imaging the frontward direction, the camera 10 is attached to an upper part of a front window shield, a rear surface of a room mirror, and the like. When imaging the rearward direction, the camera 10 is attached to an upper part of a rear window shield, a rear door, and the like. When imaging the lateral direction, the camera 10 is attached to a door mirror and the like. For example, the camera 10 periodically and repeatedly captures an image of the vicinity of the vehicle M. The camera 10 may be a stereo camera.

The radar device 12 radiates radio waves such as millimeter waves to the vicinity of the vehicle M and detects the radio waves (reflected waves) reflected by an object to detect at least a position (distance and azimuth) of the object. One or more radar devices 12 are attached to an arbitrary part of the vehicle M. The radar device 12 may detect the position and the speed of the object by use of a FMCW (Frequency-Modulated Continuous Wave) method.

The finder 14 is a LIDAR (Light Detection and Ranging, or Laser Imaging Detection and Ranging) that measures scattered light with respect to irradiation light and that detects a distance to a target. One or more finders 14 are attached to an arbitrary part of the vehicle M.

The object recognition device 16 performs a sensor fusion process with respect to a detection result by part of or all of the camera 10, the radar device 12, and the finder 14 and recognizes the position, category, speed, and the like of the object. The object recognition device 16 outputs the recognition result to the automated driving control unit 100.

The communication device 20 communicates with another vehicle that is present in the vicinity of the vehicle M, for example, by using a cellular network, a Wi-Fi network, Bluetooth (registered trademark), DSRC (Dedicated Short-Range Communication), and the like or communicates with a variety of server apparatuses via a wireless base station.

The HMI 30 presents a variety of information to an occupant of the vehicle M and accepts an input operation by the occupant. The HMI 30 includes a variety of display devices, a speaker, a buzzer, a touch panel, a switch, a key, and the like.

The switch 40 is at least one mechanical switch and is arranged at an arbitrary part in the vehicle M. For example, the switch 40 is provided, for example, on a spoke section or a wheel section of a steering wheel of the vehicle M. The switch 40 may be provided, for example, on a side part of a driver's seat or an armrest or in the vicinity of the arrangement position of the variety of display devices of the HMI 30.

The switch 40 is, for example, a button switch. The switch 40 may be a slide switch, may be a seesaw switch, may be a toggle switch, may be a dial switch, and may be a cross key. The switch 40 may be a combination switch of part of or all of the switches described above.

The switch 40 accepts an operation relating to automated driving by the automated driving control unit 100 or travel assist by the travel assist control unit 200. The travel assist by the travel assist control unit 200 is, for example, a travel assist in which the degree of travel assist is lower than the automated driving.

The navigation device 50 includes, for example, a GNSS (Global Navigation Satellite System) receiver 51, a navigation HMI 52, and a route determination unit 53. The navigation device 50 holds first map information 54 in a storage device such as a HDD (Hard Disk Drive) and a flash memory. The GNSS receiver 51 identifies the position of the vehicle M based on a signal that is received from the GNSS satellite. The position of the vehicle M may be identified or supplemented by an INS (Inertial Navigation System) that utilizes an output of the vehicle sensor 70. The navigation HMI 52 includes a display device, a speaker, a touch panel, a key, and the like. The navigation HMI 52 may share part of or all of the HMI 30 described above. For example, the route determination unit 53 determines, with reference to the first map information 54, a route from the position (or an input arbitrary position) of the vehicle M that is identified by the GNSS receiver 51 to a destination input by the occupant by using the navigation HMI 52. The first map information 54 is, for example, information in which a road shape is described by a link indicating a road and a node that is connected by the link. The first map information 54 may include the curvature of a road, POI (Point Of Interest) information, and the like. The route determined by the route determination unit 53 is output to the MPU 60. The navigation device 50 may perform a route guide using the navigation HMI 52 based on the route determined by the route determination unit 53. The navigation device 50 may be realized by, for example, a function of a terminal apparatus such as a smartphone and a tablet terminal held by the user. The navigation device 50 may transmit a current position and a destination to a navigation server via the communication device 20 and may acquire a route which is returned from the navigation server.

The MPU 60 functions, for example, as a recommended lane determination part 61. The MPU 60 holds second map information 62 in a storage device such as a HDD and a flash memory. The recommended lane determination part 61 divides the route that is supplied from the navigation device 50 into a plurality of blocks (for example, divides at an interval of 100 [m] with respect to a vehicle travel direction) and determines a recommended lane for each block with reference to the second map information 62. The recommended lane determination part 61 determines, for example, which lane from the left the vehicle should travel on. When a branching point, a merging point, or the like is present on the route, the recommended lane determination part 61 determines a recommended lane such that the vehicle M can travel on a reasonable travel route for proceeding to a branch destination.

The second map information 62 is map information having higher accuracy than the first map information 54. The second map information 62 includes, for example, information of the center of a lane, information of the boundary of a lane, or the like. The second map information 62 may include road information, traffic regulation information, address information (address and zip code), facility information, phone number information, and the like. The road information includes information representing the class of a road such as a freeway, a toll road, a national road, or a prefectural road and information of the lane number of a road, the region of an emergency parking area, the width of each lane, the gradient of a road, the position of a road (three-dimensional coordinate including the longitude, latitude, and height), the curvature of a curve of a lane, the position of merging and branching points of a lane, a sign provided on a road, and the like. The second map information 62 may be updated as needed by accessing another apparatus using the communication device 20.

The vehicle sensor 70 includes a vehicle speed sensor that detects the speed of the vehicle M, an acceleration sensor that detects acceleration, a yaw rate sensor that detects an angular speed around a vertical axis, an azimuth sensor that detects the direction of the vehicle M, and the like.

The driving operation element 80 includes, for example, an accelerator pedal, a brake pedal, a shift lever, a steering wheel, and other operation elements. A sensor that detects the amount of operation or the presence or absence of operation is attached to the driving operation element 80. A detection result of the sensor of the driving operation element 80 is output to one or both of the automated driving control unit 100, and the travel drive force output device 300, the braking device 310, and the steering device 320.

The vehicle interior camera 90 captures an image of an upper body centered at a face of the occupant seated on the driver seat. The capture image of the vehicle interior camera 90 is output to the automated driving control unit 100.

[Automated Driving Control Unit]

The automated driving control unit 100 includes, for example, a first control part 120, a second control part 130, and a HMI control part 140. Each of the first control part 120, the second control part 130, and the HMI control part 140 is realized by executing a program (software) by a processor such as a CPU (Central Processing Unit). Part of or all of functional parts of the first control part 120, the second control part 130, and the HMI control part 140 described below may be realized by hardware such as a LSI (Large-Scale Integration), an ASIC (Application-Specific Integrated Circuit), and a FPGA (Field-Programmable Gate Array) or may be realized by the cooperation of software and hardware. Part of or all of the first control part 120, the second control part 130, the HMI control part 140, and a travel assist control part 210 described below are examples of a "performance part". Part of or all of the first control part 120 and the second control part 130 are examples of an "automated driving control unit". The automated driving control unit performs automated driving that automatically controls at least one of steering, and acceleration and deceleration of the vehicle. The HMI control part 140 is an example of a "switching unit".

The first control part 120 includes, for example, an outside recognition unit 121, a vehicle position recognition unit 122, and an action plan generation unit 123.

The outside recognition unit 121 recognizes a state of the position, speed, acceleration, and the like of a peripheral vehicle based on information input via the object recognition device 16 from the camera 10, the radar device 12, and the finder 14. The position of a peripheral vehicle may be represented by a representative point such as a center of gravity or a corner of the peripheral vehicle or may be represented by a region described by the outline of the peripheral vehicle. The "state" of a peripheral vehicle may include the acceleration, jerk, or "action state" (for example, whether or not the peripheral vehicle is changing a lane, or whether or not the peripheral vehicle will change a lane) of the peripheral vehicle.

The outside recognition unit 121 may recognize positions of a guardrail, a power pole, a parked vehicle, a pedestrian, and other objects in addition to a peripheral vehicle.

The vehicle position recognition unit 122 recognizes, for example, the lane (travel lane) on which the vehicle M is travelling, and the relative position and attitude of the vehicle M with respect to the travel lane. The vehicle position recognition unit 122 recognizes the travel lane, for example, by comparing a pattern (for example, an arrangement of a solid line and a dashed line) of a road partition line that is obtained from the second map information 62 to a pattern of a road partition line in the vicinity of the vehicle M that is recognized from the image captured by the camera 10. The position of the vehicle M that is acquired from the navigation device 50 and the process result by the INS may be added to this recognition.

Figure 2:
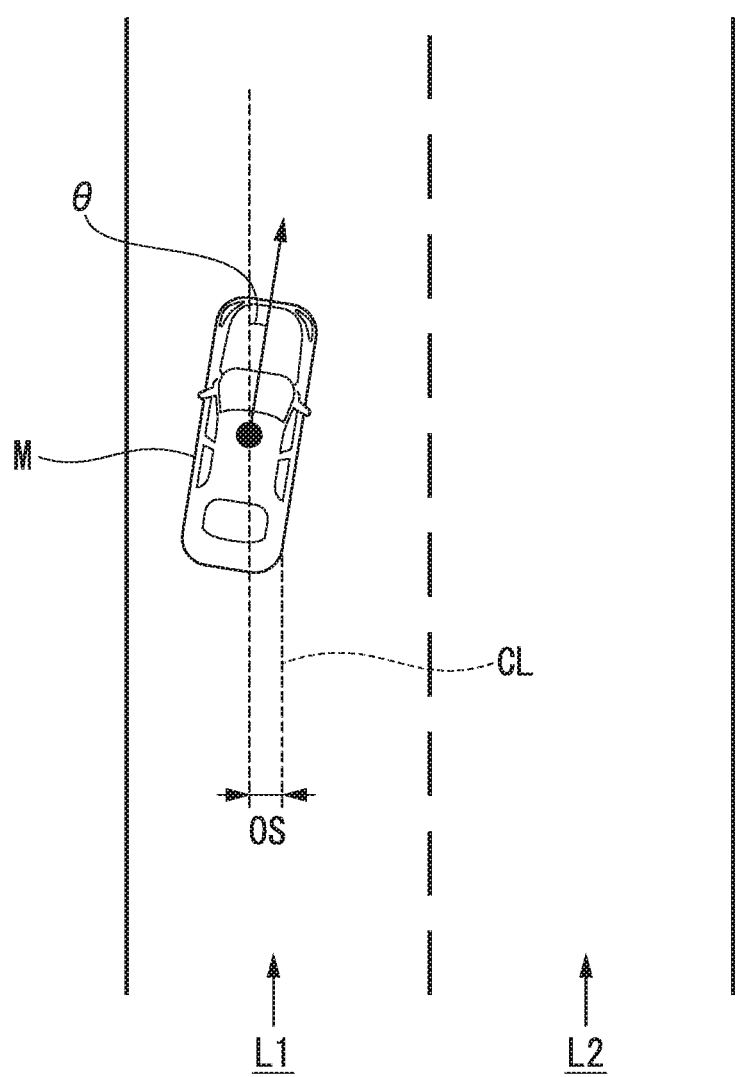
FIG. 2 is a view showing a state in which a relative position and an attitude of a vehicle with respect to a travel lane are recognized by a vehicle position recognition unit.

Then, the vehicle position recognition unit 122 recognizes, for example, the position and the attitude of the vehicle M with respect to the travel lane. FIG. 2 is a view showing a state in which the relative position and the attitude of the vehicle M with respect to a travel lane L1 are recognized by the vehicle position recognition unit 122. For example, the vehicle position recognition unit 122 recognizes, as the relative position and the attitude of the vehicle M with respect to the travel lane L1, a gap OS of a reference point (for example, the center of gravity) of the vehicle M from a travel lane center CL and an angle θ formed by the travel direction of the vehicle M with respect to a line formed of the continued travel lane centers CL. Alternatively, the vehicle position recognition unit 122 may recognize, as the relative position of the vehicle M with respect to the travel lane, the position of the reference point of the vehicle M with respect to any of side end parts of the travel lane L1 and the like. The relative position of the vehicle M that is recognized by the vehicle position recognition unit 122 is supplied to the recommended lane determination part 61 and the action plan generation unit 123.

[Action Plan Generation]

The action plan generation unit 123 generates an action plan for the vehicle M to perform automated driving to a destination and the like. For example, the action plan generation unit 123 determines events that are sequentially performed in an automated driving control so as to travel on the recommended lane that is determined by the recommended lane determination part 61 and so as to be capable of responding to peripheral circumstances of the vehicle M. Examples of the event in the automated driving of the embodiment include a constant speed travel event of traveling on the same travel lane at a constant speed, a lane-change event of changing the travel lane of the vehicle M, an overtaking event of overtaking a frontward traveling vehicle, a merging event that causes the vehicle to merge at a merging point, a branching event that causes the vehicle M to travel to a target direction at a branching point of a road, an emergency stop event that causes the vehicle M to stop urgently, and a handover event for finishing automated driving and switching to manual driving. Further, an action for avoidance may be planned based on peripheral circumstances (presence of a peripheral vehicle or a pedestrian, lane narrowing due to a roadwork, and the like) of the vehicle M while performing the events.

The action plan generation unit 123 generates a target trajectory on which the vehicle M will travel. The target trajectory includes, for example, a speed element. For example, a plurality of future reference times are set at each predetermined sampling time (for example, about several hundred milliseconds), and the target trajectory is generated as a set of target points (trajectory points) to be arrived at at the reference times. Therefore, when the spacing of the trajectory points is large, the large spacing of the trajectory points indicates that the vehicle travels in a zone between the trajectory points at high speed.

Figure 3:
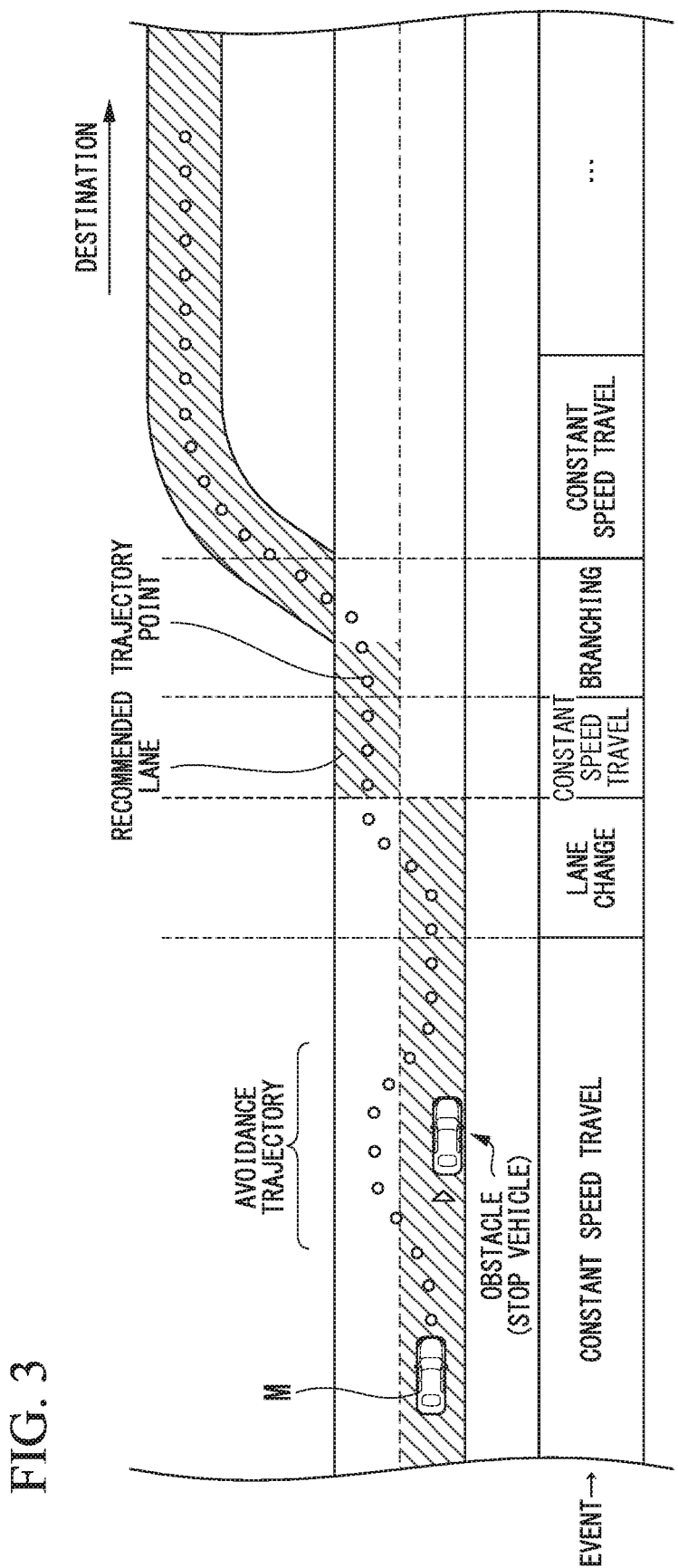
FIG. 3 is a view showing a state in which a target trajectory is generated based on a recommended lane.

FIG. 3 is a view showing a state in which a target trajectory is generated based on a recommended lane. As shown in FIG. 3, the recommended lane is set such that it is convenient to travel along a route to a destination.

When arriving at a position (the position may be determined corresponding to the category of an event) by a predetermined distance before a position at which the recommended lane is switched, the action plan generation unit 123 starts a lane-change event, a branching event, a merging event, and the like. When it becomes necessary to avoid an obstacle while performing the events, an avoidance trajectory is generated as shown in FIG. 3.

The action plan generation unit 123 generates, for example, a plurality of candidates of the target trajectory and selects an optimum target trajectory that fits the route to the destination at that time point based on a point of view of safety and efficiency. The action plan generation unit 123 may generate information relating to the timing when a setting to a specific event that is being performed can be changed based on a point of view of safety and efficiency of travel assist of the vehicle M.

The second control part 130 includes, for example, a travel control unit 131. The travel control unit 131 controls the travel drive force output device 300, the braking device 310, and the steering device 320 such that the vehicle M passes through the target trajectory that is generated by the action plan generation unit 123 exactly at a scheduled time.

[HMI Control]

When accepting an operation of the switch 40 (for example, a first switch described below), the HMI control part 140 controls the first control part 120, the second control part 130, and the travel assist control unit 200 such that travel assist of the vehicle M is performed in a mode in which an assist degree is the largest at that time point corresponding to travel circumstances of the vehicle M. For example, when accepting an operation of the switch 40 and when automated driving to the vehicle M is performable, the HMI control part 140 causes the first control part 120 and the second control part 130 to perform automated driving. When accepting an operation of the switch 40 and when automated driving is not performable, the HMI control part 140 causes the travel assist control unit 200 to perform travel assist.

The HMI control part 140 causes the HMI 30 to present, to the occupant, information relating to the automated driving or the travel control assist that is performed on the vehicle M.

[Travel Assist Control Unit]

The travel assist control unit 200 includes, for example, the travel assist control part 210. The travel assist control unit 200 holds a set information table 220 in a storage device such as a HDD and a flash memory. The travel assist control part 210 is realized by executing a program by a processor such as a CPU. The travel assist control part 210 may be realized by hardware such as a LSI, an ASIC, and a FPGA or may be realized by the cooperation of software and hardware.

When accepting a command to perform a travel assist control by the HMI control part 140, the travel assist control part 210 performs travel assist based on manual driving of the occupant. Examples of the travel assist include an ADAS (Advanced Driver Assistance System). In this case, the travel assist control part 210 determines events that are sequentially performed in the ADAS. The performed events include, for example, at least one of an ACC (Adaptive Cruise Control System) event, a LKAS (Lane-Keeping Assistance System) event, a collision reduction braking event, and a LDW (Lane-Departure Warning) event. The degree of travel assist becomes larger, for example, as the number of performable events becomes larger. The "travel assist" in the embodiment includes part of or all of the controls in each event shown below.

For example, when the ACC event is performed, the travel assist control part 210 performs travel assist to keep the inter-vehicle distance between the vehicle M and a frontward traveling vehicle constant. When a frontward traveling vehicle is not present, the travel assist control part 210 travels while maintaining a set speed. When the LKAS event is performed, the travel assist control part 210 performs a steering control by the steering device 320 and causes the vehicle M to travel while maintaining the current travel lane.

When the collision reduction braking event is performed, the travel assist control part 210 determines, from a detection result of an obstacle such as a frontward traveling vehicle of the vehicle M, an oncoming vehicle, and a pedestrian, a risk of collision with the obstacle. Then, when it is determined that there is a risk of collision, the travel assist control part 210 causes the HMI 30 to present information relating to the risk in a mode such as a screen display and a speech output. Further, when a risk avoidance control of the vehicle M is not performed by the occupant even after the information relating to the risk is presented, the travel assist control part 210 automatically reduces a travel drive force by the travel drive force output device 300 and performs travel assist such as braking by the braking device 310.

When the LDW event is performed, the travel assist control part 210 causes the HMI 30 to present, before the vehicle M will be deviated from the travel lane, information indicating that the vehicle M will be deviated from the travel lane in a mode such as a screen display and a speech output.

Set information that is required when each event described above is performed is stored in the set information table 220. FIG. 4 is a view showing an example of the set information table 220. In the set information table 220, for example, an item that can be set by the occupant in a travel assist control and a set content of the item are associated with each other. The item that can be set by the occupant is, for example, a set speed of the vehicle M and a set inter-vehicle distance with a frontward traveling vehicle.

The travel assist control part 210 may store a set content such as a set speed and a set inter-vehicle distance in the set information table 220 or may change the set content of the set information table 220 based on an operation content that is accepted by the switch 40 while performing travel assist of the vehicle M. The travel assist control part 210 may perform travel assist that corresponds to the set content of the set information table 220 based on the operation content that is accepted by the switch 40.

[Switch]

Figure 5:
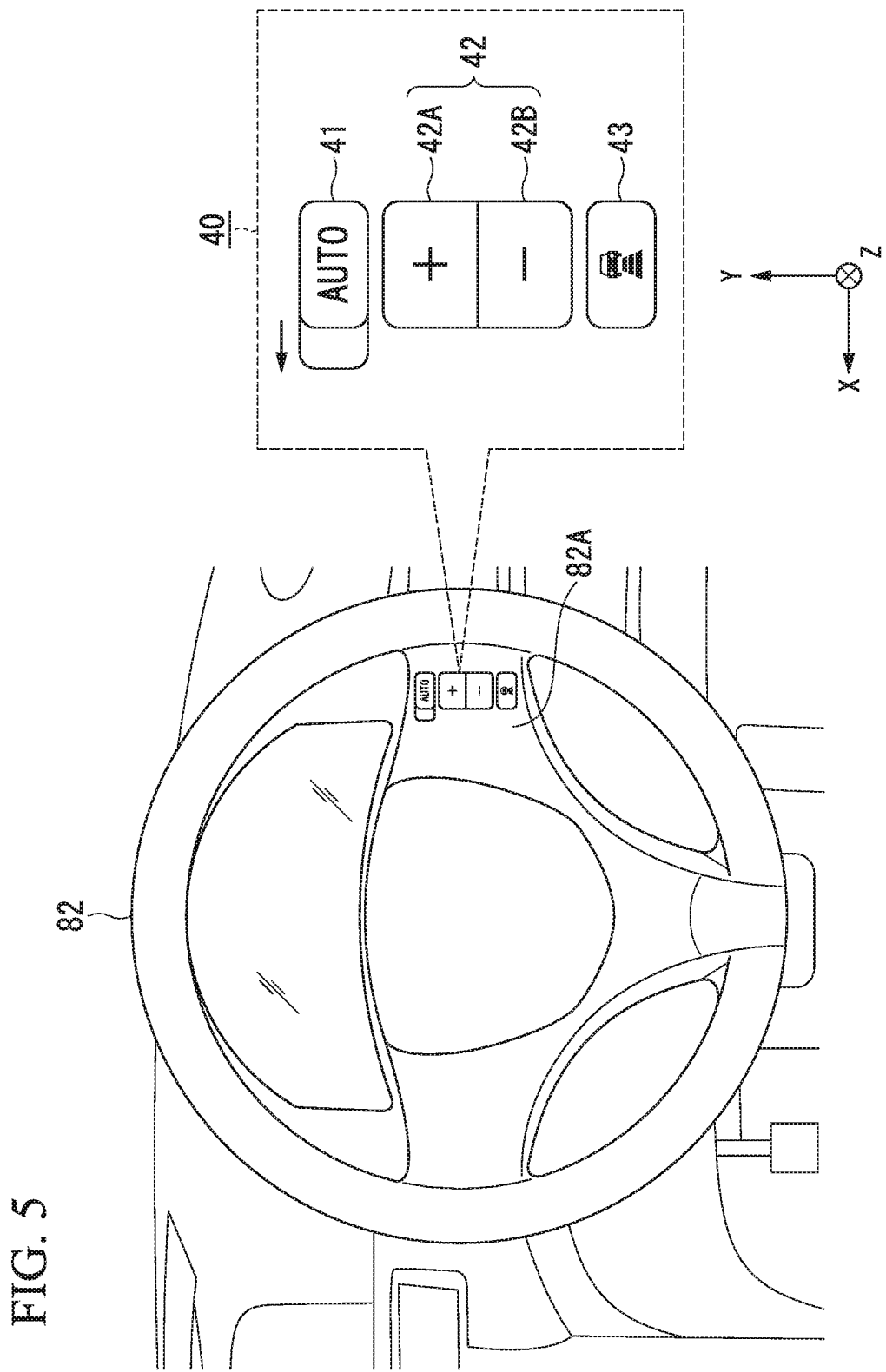
FIG. 5 is a view showing an example of a configuration of a switch in the embodiment.

A specific example of the switch 40 in the embodiment is described. FIG. 5 is a view showing an example of a configuration of the switch 40 in the embodiment. In the example shown in FIG. 5, the switch 40 is provided on a spoke part 82A of a steering wheel 82. The switch 40 can be arranged at a position where the switch can be operated while the occupant grips the steering wheel with his hand. The switch 40 includes, for example, a first switch 41, a second switch 42, and a third switch 43.

The first switch 41 is, for example, a switch that accepts an operation of being pressed down in a Z direction shown in FIG. 5 by the occupant. The first switch 41 may be a switch that accepts an operation of being slid in a X direction shown in FIG. 5 by the occupant or may be a switch that accepts a combined operation of the operation of being pressed down and the operation of being slid.

The second switch 42 is, for example, a seesaw switch. The second switch 42 can detect, for example, the depth of a switch operation of the occupant.

The third switch 43 is a switch that accepts an operation of being pressed down in a Z direction shown in FIG. 5 by the occupant.

Each of the first switch 41, the second switch 42, and the third switch 43 may include a bias member such as a spring that applies a force which causes the switch to return to the original position after accepting an operation by the occupant.

For example, the travel assist control part 210 stores a set speed in the set information table 220 based on an operation performed on the first switch 41. In this case, for example, when accepting an operation of the first switch 41 in a state where the travel assist is performable and in a state where a predetermined condition is satisfied, the travel assist control part 210 stores, in the set information table 220, the current travel speed of the vehicle M as the set speed. The state where the travel assist is performable may be a state before or after the travel assist is performed or may be a state while the travel assist is performed. The predetermined condition is, for example, a case in which the vehicle M is traveling at a predetermined speed (for example, 40 km/h) or more. In this case, the first switch 41 works as a setting function of a set speed.

When accepting an operation of the first switch 41 again, after a predetermined cancel operation is performed in a state where the set speed is set and the vehicle M is traveling, the travel assist control part 210 causes the travel speed of the vehicle M in the travel assist to return to the set speed. The predetermined cancel operation may be, for example, a case in which an operation of the driving operation element 80 such as a brake pedal by the occupant is accepted or may be a case in which a predetermined button (for example, a cancel button) that is provided in the vehicle M is pressed. In this case, the first switch 41 works as a returning function to the set speed.

The travel assist control part 210 clears the set speed stored in the set information table 220, for example, when a predetermined period of time has elapsed since it becomes possible to cause the travel speed of the vehicle M to return to the set speed as the returning function when accepting an operation of the first switch 41.

The travel assist control part 210 may clear the set speed stored in the set information table 220 when the vehicle M moves to a road of a different class from the road on which the vehicle M is currently traveling in a state where it is possible to cause the travel speed of the vehicle M to return to the set speed as the returning function when accepting an operation of the first switch 41. The case of moving to a road of a different class from the current travel road is, for example, a case in which the travel road is changed between a general road and a freeway, and the like. The travel assist control part 210 acquires a road class and the like from the second map information 62 and the like, for example, based on the current position of the vehicle M.

The travel assist control part 210 makes the returning to the set speed of the vehicle M impossible by clearing the set speed described above. The travel assist control part 210 may make the returning to the set speed of the vehicle M impossible by not accepting the operation content by the first switch 41 without clearing the set speed in the above-described condition.

Thereby, the occupant can promptly perform, using the first switch 41, setting of the set speed, returning to the set speed, and the like in a state where the travel assist is performable by a simple operation. Further, it is possible to clear the set speed at an appropriate timing using the first switch 41, and therefore, it is possible to prevent the speed of the vehicle M from becoming an unintended travel speed by the occupant.

The travel assist control part 210 changes the set speed of the vehicle M that is stored in the set information table 220 based on an operation performed on the second switch 42. When a predetermined cancel operation is performed while changing the set speed, the travel assist control part 210 causes the set speed to return to the set speed before the change. The predetermined cancel operation is, for example, an operation of, in a process of changing the set speed in one direction, trying to operate the set speed in the opposite direction. For example, as the predetermined cancel operation, when accepting a decreasing operation of the set speed by the operation of the second switch 42, after accepting an increasing operation of the set speed by the operation of the second switch 42 by the occupant and before the operation is fixed, the travel assist control part 210 causes the set speed to return to the set speed before the change.

Further, when a predetermined period of time has elapsed since an operation of changing the set speed by the second switch 42 is accepted, or when vehicle M performs lane change while accepting the change of setting (for example, when the center of gravity or the like of the vehicle M passes through a road partition line), the travel assist control part 210 determines that the predetermined cancel operation is performed and cancels the operation content that has been accepted until then by the second switch 42.

When canceling the travel assist of causing the speed of the vehicle M to return to the set speed, the travel assist control part 210 may change the set speed of the set information table 220 based on the speed of the vehicle M at that time point of cancellation.

Figure 6:
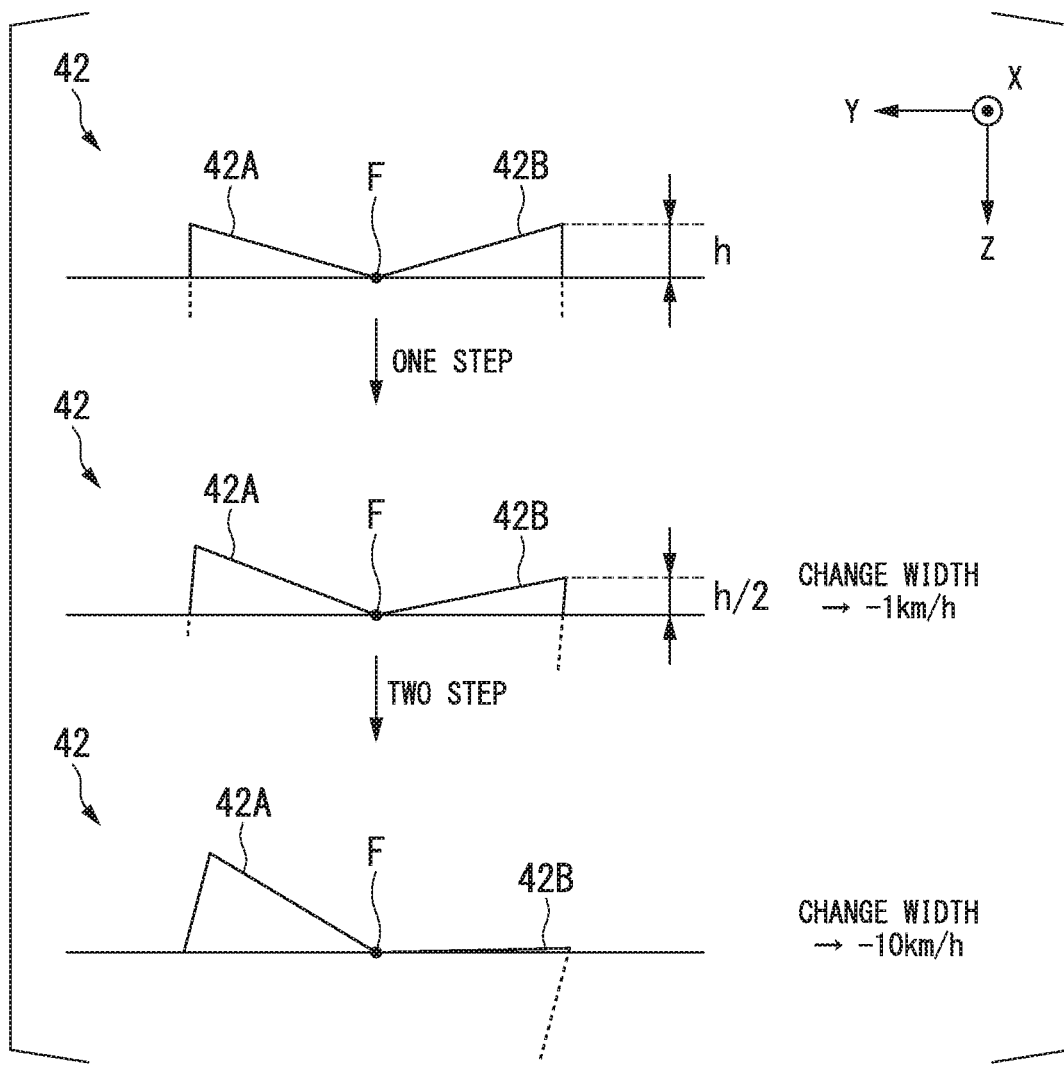
FIG. 6 is a view describing a relationship between an operation depth of a second switch and a change width of a set speed based on the depth.

The travel assist control part 210 may change a change width (or ratio) of the set speed based on an operation depth that is detected by the second switch 42. FIG. 6 is a view describing a relationship between the operation depth of the second switch 42 and the change width of the set speed based on the depth.

The second switch 42 has a rotatable structure around the X axis by the operation by the occupant such that the boundary between a plus-side switch 42A and a minus-side switch 42B is a fulcrum F.

In the example of FIG. 6, when the minus-side switch 42B is pressed down in the Z direction by the operation of the occupant, and an end part of the minus-side switch 42B becomes a height h/2, the travel assist control part 210 performs a control in which the current set speed is decreased by a 1 [km/h] unit based on a depth (movement amount) of the minus-side switch 42B that is pressed down.

When the minus-side switch 42B is further pressed down in the Z direction by the occupant, and the end part of the minus-side switch 42B becomes a height 0, the travel assist control part 210 performs a control in which the current set speed is decreased by a 10 [km/h] unit based on the depth of the minus-side switch 42B that is pressed down.

The travel assist control part 210 performs a control in which the set speed is increased by a 1 [km/h] unit or a 10 [km/h] unit depending on the height (depth) of the end part of the plus-side switch 42A similarly to the minus-side switch 42B. The change width of the set speed is not limited thereto. Thereby, even in a case where it becomes necessary to considerably change the set speed of the vehicle M while traveling, the occupant can promptly change the set speed to a target set speed by a simple operation. The case where it becomes necessary to considerably change the set speed is, for example, a case where the travel lane of the vehicle M is changed from a general road to a freeway, a case where the travel lane of the vehicle M is changed from a freeway to a general road, a case where a traffic jam of the travel lane is resolved, and the like.

The travel assist control part 210 changes the set inter-vehicle distance of the set information table 220 based on the operation content performed on the third switch 43. For example, the travel assist control part 210 sequentially changes the set inter-vehicle distance to any of preliminarily set distances, which are a short distance, a middle distance, a long distance, and the like, at each time the third switch 43 is pressed down by the occupant.

Figure 7:
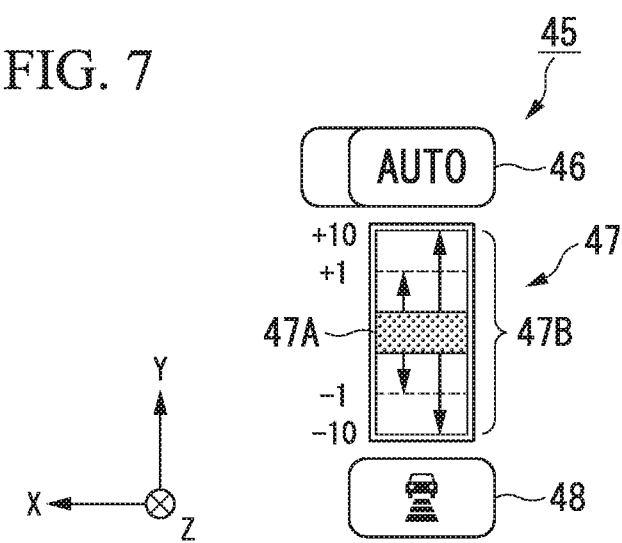
FIG. 7 is a view showing an example of a configuration of a switch.

A switch 45 described below may be provided in place of the switch 40 described above. FIG. 7 is a view showing an example of a configuration of the switch 45. The switch 45 may be provided, for example, on the spoke part 82A of the steering wheel 82 and the like.

The switch 45 includes, for example, a first switch 46, a second switch 47, and a third switch 48. Since the first switch 46 has a similar configuration to the first switch 41 described above, and the third switch 48 has a similar configuration to the third switch 43 described above, specific descriptions are omitted.

The second switch 47 is, for example, a toggle switch. The second switch 47 includes, for example, a projection part 47A. The second switch 47 is a switch that accepts an operation of sliding the projection part 47A by the occupant in the ±Y direction in a range of a movable region 47B. The second switch 47 can detect, for example, the movement amount of the projection part 47A. The second switch 47 may include a bias member such as a spring that applies a force which causes the projection part 47A to return to the original position when a force is not applied to the projection part 47A after accepting the operation by the occupant.

When accepting that the projection part 47A is operated to be slid in the −Y direction by the occupant, the travel assist control part 210 performs a control in which the current set speed of the vehicle M is decreased. The travel assist control part 210 may change a change width (or ratio) of the set speed based on the movement amount of the projection part 47A that is detected by the second switch 47.

For example, when the movement amount (>0) in the −Y direction of the projection part 47A is smaller than a threshold value, the travel assist control part 210 performs a control in which the current set speed is decreased by a 1 [km/h] unit. When the movement amount in the −Y direction of the projection part 47A is equal to or larger than the threshold value, the travel assist control part 210 performs a control in which the current set speed is decreased by a 10 [km/h] unit.

When accepting that the projection part 47A is operated to be slid in the Y direction by the occupant, the travel assist control part 210 performs a control in which the current set speed of the vehicle M is increased. In this case, the travel assist control part 210 may change the change width at one of two steps, which are a 1 [km/h] unit and a 10 [km/h] unit, depending on the movement amount of the projection part 47A described above.

In this way, by using a toggle switch for the second switch 47, the occupant can visually recognize the position of the projection part 47A and can easily understand the change width of the set speed. Accordingly, it is possible to prevent an erroneous operation and the like at the time of setting the set speed.

The travel drive force output device 300 outputs, to a drive wheel, a travel drive force (torque) by which the vehicle travels. The travel drive force output device 300 includes, for example, the combination of an internal combustion engine, an electric motor, a transmission, and the like and an ECU (Electronic Control Unit) that controls the internal combustion engine, the electric motor, the transmission, and the like. The ECU controls the above configuration in accordance with information input from the travel control unit 131 or information input from the driving operation element 80.

The braking device 310 includes, for example, a brake caliper, a cylinder that transmits an oil pressure to the brake caliper, an electric motor that generates the oil pressure at the cylinder, and a brake ECU. The brake ECU controls the electric motor, in accordance with the information input from the travel control unit 131, the information input from the travel assist control part 210, or the information input from the driving operation element 80, to output a braking torque corresponding to a braking operation to each wheel. The braking device 310 may include, as a backup, a mechanism that transmits, to the cylinder via a master cylinder, an oil pressure generated by an operation of the brake pedal included in the driving operation element 80. The braking device 310 is not limited to the configuration described above and may be an electronically-controlled hydraulic braking device that controls an actuator in accordance with the information input from the travel control unit 131, the information input from the travel assist control part 210, or the information input from the driving operation element 80 and transmits the oil pressure of the master cylinder to the cylinder. The braking device 310 may include a plurality of braking device systems in consideration of safety.

The steering device 320 includes, for example, a steering ECU and an electric motor.

For example, the electric motor applies a force to a rack and pinion mechanism and changes the direction of a steering wheel. The steering ECU drives the electric motor and changes the direction of the steering wheel in accordance with the information input from the travel control unit 131, the information input from the travel assist control part 210, or the information input from the driving operation element 80.

[Screen Example]

Next, an example of information presented on the HMI 30 by the control of the HMI control part 140 according to the embodiment is described. Information presented on the HMI 30 when performing automated driving and information presented on the HMI 30 when performing a travel assist control are separately described below.

Figure 8:
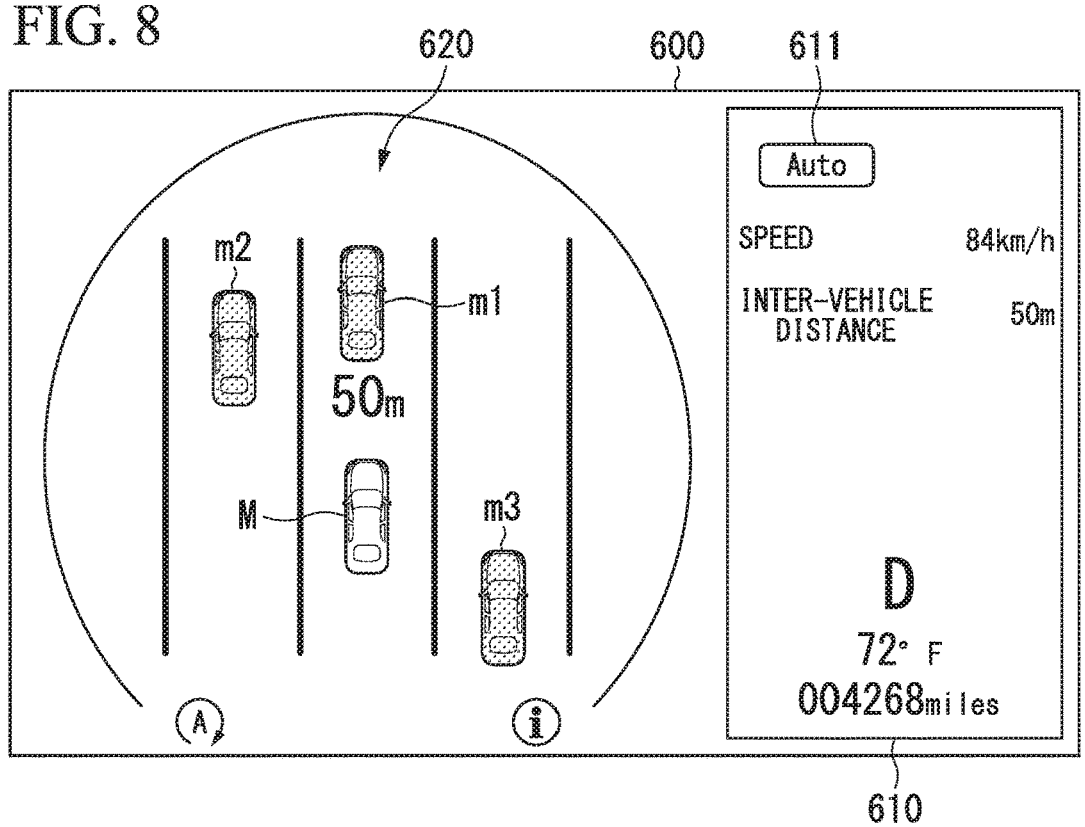
FIG. 8 is a view showing an example of a screen presented on a display device of a HMI when performing automated driving.

FIG. 8 is a view showing an example of a screen presented on a display device of the HMI 30 when performing automated driving. A display screen 600 shown in FIG. 8 has a travel information display region 610 and a travel state display region 620. The HMI control part 140 causes the travel information display region 610 to include information relating to a variety of information regarding the travel of the vehicle M and the like. Examples of the information included in the travel information display region 610 include a drive mode (for example, Auto) 611 of the vehicle M, the speed and inter-vehicle distance of the vehicle M during automated driving, a shift position, an external air temperature, a travel distance, and the like.

The HMI control part 140 causes the travel state display region 620 to include information relating to an environmental state of the vehicle M and the like. Examples of the information included in the travel state display region 620 include a map image around the vehicle M that is acquired from the second map information 62 with reference to the current position of the vehicle M, an image associated with the vehicle M, and images associated to peripheral vehicles m1 to m3.

Figure 9:
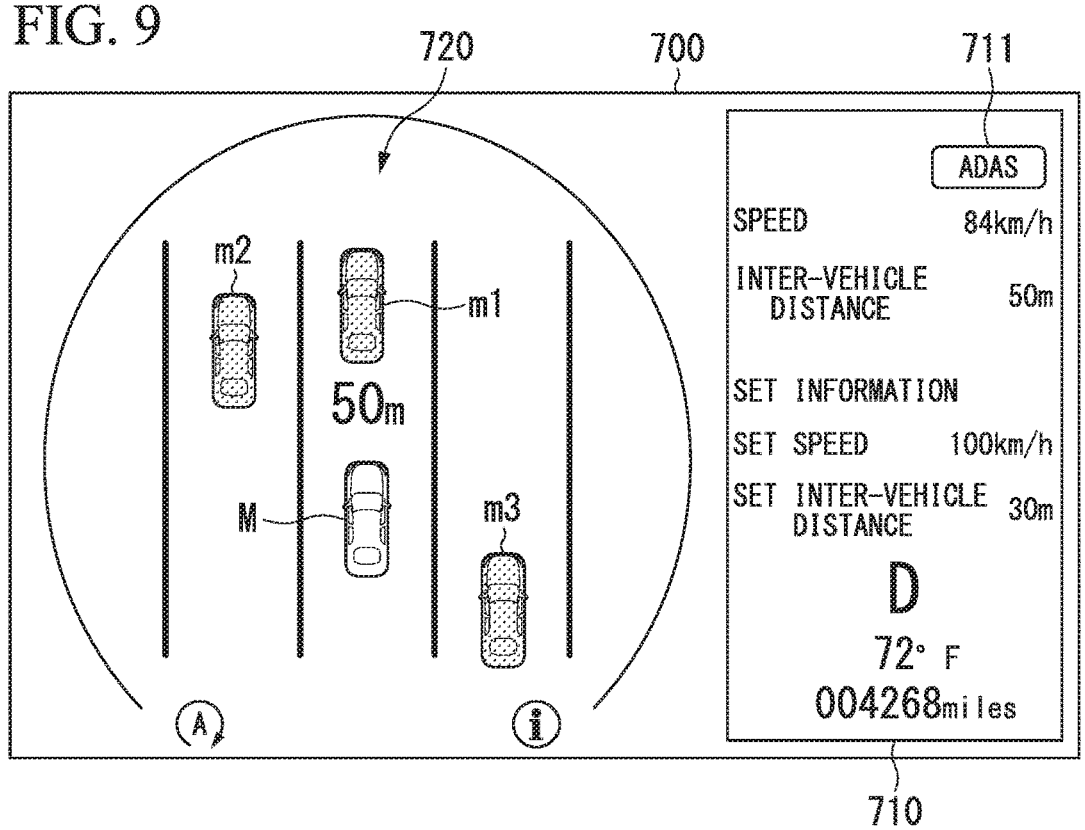
FIG. 9 is a view showing an example of a screen presented on the display device of the HMI when performing a travel assist control.

FIG. 9 is a view showing an example of a screen presented on the display device of the HMI 30 when performing a travel assist control. A display screen 700 shown in FIG. 9 has, for example, a travel information display region 710 and a travel state display region 720.

The HMI control part 140 causes the travel information display region 710 to include information relating to a variety of information regarding the travel of the vehicle M and the like. Examples of the information included in the travel information display region 710 include a drive mode (for example, ADAS) 711 of the vehicle M, the current speed and inter-vehicle distance of the vehicle M, a set speed of the set information table 220, a set inter-vehicle distance, a shift position, an external air temperature, a travel distance, and the like. Similar contents to the travel state display region 620 are displayed in the travel state display region 720.

In this way, by looking at the travel information display region 610 shown in FIG. 8 and the travel information display region 710 shown in FIG. 9, the occupant can easily understand the current assist degree of the vehicle M.

By displaying set information on the travel information display region 710 when performing the travel assist control, even when a set change is performed, the occupant can easily understand the content of the set change. The HMI control part 140 may output, by speech, the information shown in FIG. 8 and FIG. 9 using a speaker of the HMI 30 and the like.

[Vehicle Control Process]

Figure 10:
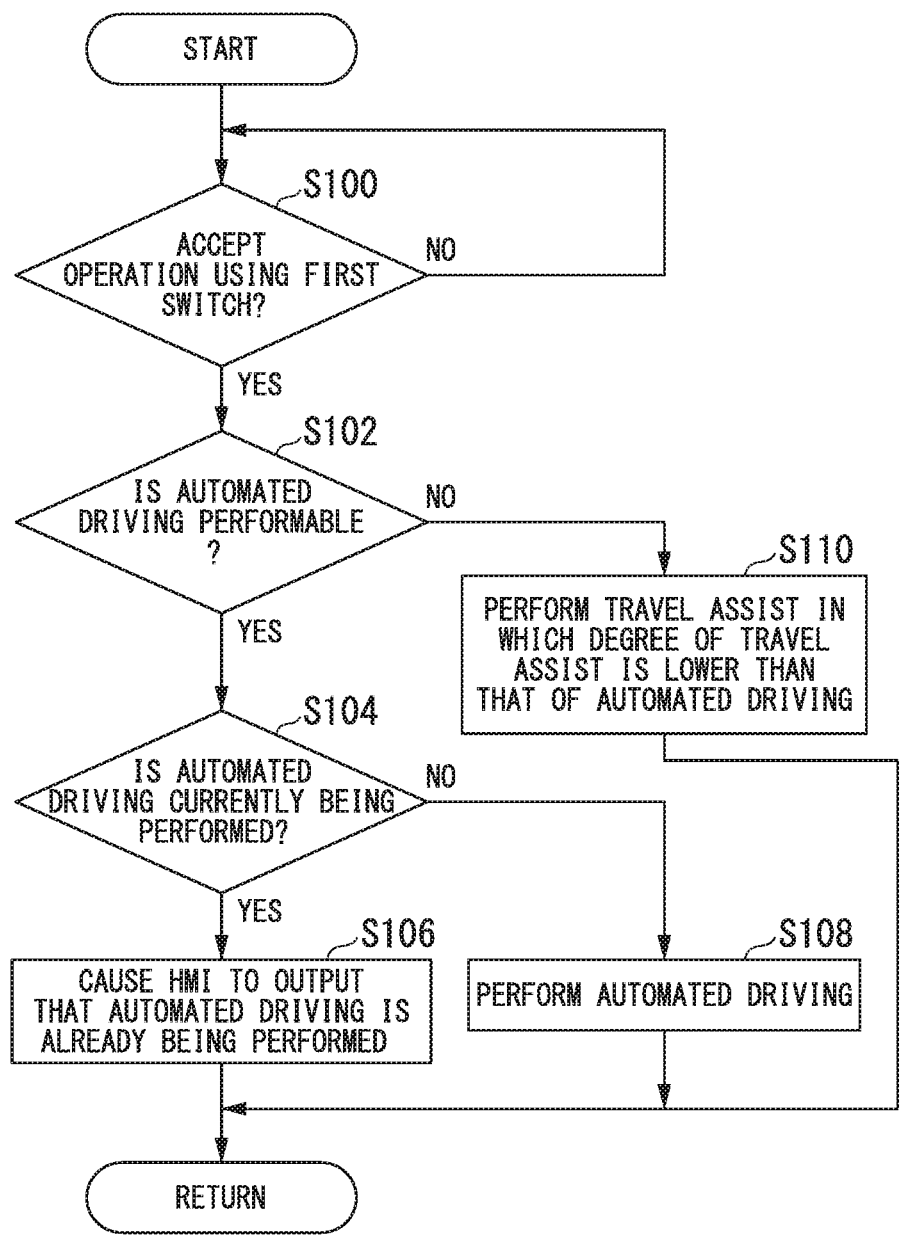
FIG. 10 is a flowchart showing an example of a vehicle control process of the embodiment.

Hereinafter, a variety of vehicle controls by the vehicle system 1 are described. FIG. 10 is a flowchart showing an example of a vehicle control process of the embodiment. The process of FIG. 10 is performed, for example, repeatedly at a predetermined period.

First, the HMI control part 140 determines whether or not an operation using the first switch 41, 46 is accepted (Step S100). When the operation using the first switch 41, 46 is accepted, the HMI control part 140 determines whether or not the vehicle M is in a state where automated driving is performable (Step S102).

When automated driving is performable, the HMI control part 140 determines whether or not the vehicle M is currently performing automated driving (Step S104). When automated driving is currently being performed, the HMI control part 140 causes the HMI 30 to output that automated driving is already being performed (Step S106). When automated driving is not currently being performed, the HMI control part 140 commands the first control part 120 and the second control part 130 to perform automated driving of the vehicle M (Step S108).

In Step S102, when the vehicle M is not in the state where automated driving is performable, the HMI control part 140 commands the travel assist control part 210 to perform travel assist in which the degree of travel assist is lower than that of the automated driving (Step S110). In this case, when accepting an operation using the first switch 41 in a state where travel assist is performable, the travel assist control part 210 performs the setting function of a set speed, returning to a set speed, or the like based on a predetermined condition, timing, or the like. Thereby, the process of the present flowchart is finished.

Next, a control process corresponding to an operation of the switches 40, 45 when the travel assist control of the vehicle M is being performed by the travel assist control part 210 is described using a flowchart.

Figure 11:
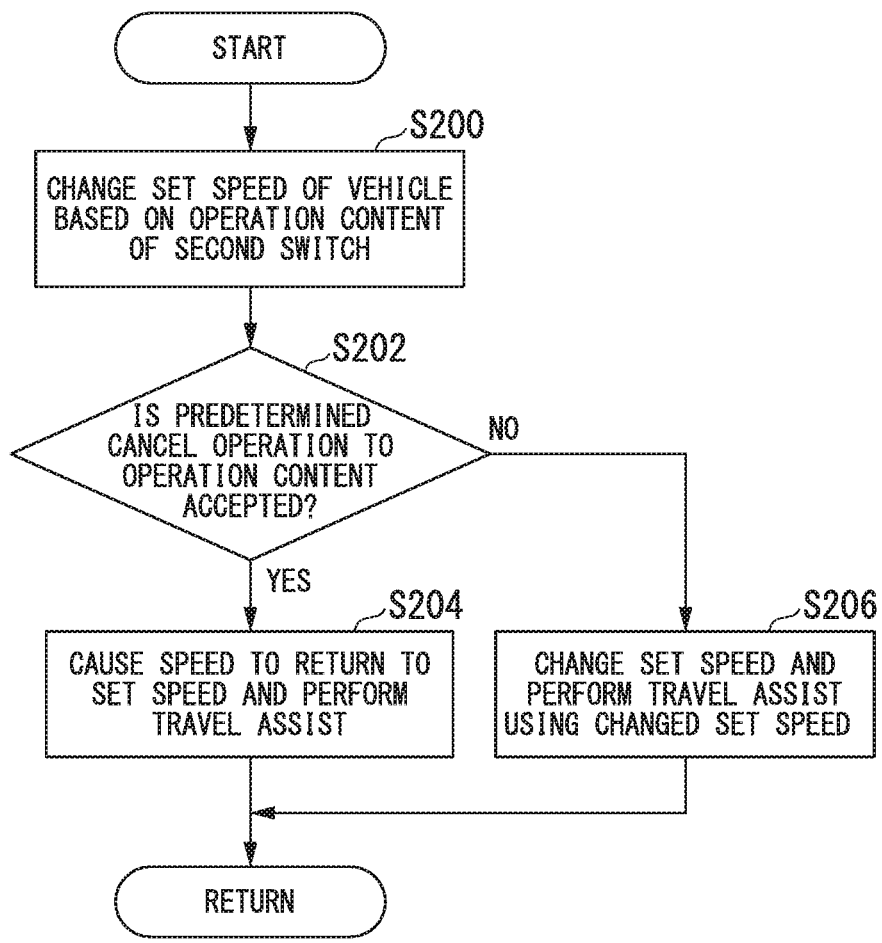
FIG. 11 is a flowchart showing an example of a control process with respect to a switch operation during a travel assist control.

FIG. 11 is a flowchart showing an example of a control process with respect to a switch operation during a travel assist control. In the example of FIG. 11, first, the travel assist control part 210 changes the set speed of the vehicle M based on operation contents of the second switches 42, 47 when the vehicle M is performing a travel assist control (Step S200). Next, the travel assist control part 210 determines whether or not a predetermined cancel operation to the operation contents of the second switches 42, 47 is accepted (Step S202).

When a cancel operation to the operation contents is accepted, the travel assist control part 210 causes the speed of the vehicle M to return to the set speed before changing that is stored in the set information table 220 and performs travel assist (Step S204). When a cancel operation to the operation contents is not accepted, the travel assist control part 210 changes the set speed of the set information table 220 based on the accepted operation contents and performs travel assist at the changed set speed (Step S206). Thereby, the process of the present flowchart is finished.

According to the vehicle control system, the vehicle control method, and the vehicle control program in the embodiment described above, the vehicle control system can allow the occupant to easily perform the operation relating to the travel assist.

More specifically, according to the embodiment, the vehicle control system can switch between the automated driving and the travel assist only by the switch operation of the occupant to the first switch and can perform a travel control that allows priority to the automated driving. Further, according to the embodiment, the vehicle control system can perform the cancel operation to the change of the set speed in response to the operation content or the operation timing of the second switch. Accordingly, the occupant can easily perform the operations of changing the set speed and returning to the set speed before the change using the second switch. Further, according to the present embodiment, the occupant can promptly change the set speed to a target set speed by a simple switch operation, for example, even in a case where it becomes necessary to considerably change the set speed of the vehicle during traveling.

According to the embodiment, by using a toggle switch fin the second switch, it becomes easier for the occupant to visually recognize the movement amount of the second switch compared to a seesaw switch. Accordingly, the occupant can change the set speed of the vehicle M by an intended change width. Further, according to the embodiment, the occupant can easily understand the degree of the travel assist of the vehicle by the HMI 30.

Although the embodiment of the invention has been described with reference to the drawings, the invention is not limited to the embodiment described above, and a variety of changes and substitution can be added without departing from the scope of the invention.

What is claimed is:

1. A vehicle control system, comprising:
a first switch that accepts an operation of an occupant of a vehicle;
an automated driving controller that performs automated driving in which acceleration, deceleration, and steering of the vehicle is automatically controlled;
a travel assist controller that performs travel assist in which a degree of the travel assist is lower than that of the automated driving; and
a switching controller that switches between the automated driving and the travel assist,
wherein in a case where the operation of the first switch by the occupant is accepted, the switching controller performs the automated driving of the vehicle by the automated driving controller when the automated driving of the vehicle is performable and is not currently being performed, and performs the travel assist of the vehicle by the travel assist controller when the automated driving is not performable,
wherein in a state where the travel assist is performable, the travel assist controller performs the travel assist which sets a current travel speed of the vehicle as a set speed of the vehicle in the travel assist when accepting the operation of the first switch, and performs the travel assist which causes a travel speed of the vehicle to return to the set speed when accepting the operation of the first switch again after a predetermined cancel operation is performed, and
wherein when a predetermined period of time has elapsed since it becomes possible to cause the travel speed of the vehicle in the travel assist to return to the set speed, or when the vehicle moves to a road of a different class from a road on which the vehicle is currently traveling in a state where it is possible to cause the travel speed of the vehicle in the travel assist to return to the set speed, the travel assist controller causes returning to the set speed to be unperformable even if the operation of the first switch is accepted.

2. The vehicle control system according to claim 1, further comprising a second switch that accepts an operation of the occupant which changes the set speed of the vehicle that is set by the first switch,
wherein the travel assist controller changes a set speed in the travel assist based on an operation to the second switch during performing travel assist of the vehicle and causes the set speed to return to a set speed before the change when a predetermined cancel operation is performed during changing the set speed.

3. The vehicle control system according to claim 2, wherein the predetermined cancel operation is an operation in which an operation in an acceleration direction to the second switch is performed, and an operation in a deceleration direction to the second switch is performed before the operation in the acceleration direction is fixed.

4. The vehicle control system according to claim 2, wherein when a predetermined period of time has elapsed since the travel assist controller accepts an operation of changing the set speed by the second switch, or when the vehicle performs lane change while accepting an operation of changing the set speed by the second switch, the travel assist controller determines that the predetermined cancel operation is performed and causes the set speed to return to a set speed before the change.

5. The vehicle control system according to claim 2, wherein when it is determined that the predetermined cancel operation is performed while performing travel assist that causes a speed of the vehicle to return to the set speed, the travel assist controller cancels the travel assist that causes the speed of the vehicle to return to the set speed.

6. The vehicle control system according to claim 2, wherein the travel assist controller changes a change width of the set speed based on a movement amount of the second switch.

7. The vehicle control system according to claim 2, wherein the second switch includes a toggle switch.

8. The vehicle control system according to claim 1, further comprising an interface part that presents information relating to automated driving or travel assist of the vehicle.

9. A vehicle control method, by way of an in-vehicle computer, comprising:
performing automated driving in which acceleration/deceleration and steering of a vehicle is automatically controlled;
performing travel assist in which a degree of travel assist is lower than that of the automated driving;
switching between the automated driving and the travel assist;
in a case where an operation of a first switch by an occupant of the vehicle is accepted, performing the automated driving of the vehicle when the automated driving of the vehicle is performable and is not currently being performed, and performing the travel assist of the vehicle when the automated driving is not performable;
in a state where the travel assist is performable, performing travel assist which sets a current travel speed of the vehicle as a set speed of the vehicle in the travel assist when accepting the operation of the first switch, and performing travel assist which causes a travel speed of the vehicle to return to the set speed when accepting the operation of the first switch again after a predetermined cancel operation is performed; and
when a predetermined period of time has elapsed since it becomes possible to cause the travel speed of the vehicle in the travel assist to return to the set speed, or when the vehicle moves to a road of a different class from a road on which the vehicle is currently traveling in a state where it is possible to cause the travel speed of the vehicle in the travel assist to return to the set speed, causing returning to the set speed to be unperformable even if the operation of the first switch is accepted.

10. A non-transitory computer-readable recording medium comprising a vehicle control program that causes an in-vehicle computer to:
perform automated driving in which acceleration, deceleration, and steering of a vehicle is automatically controlled;
perform travel assist in which a degree of travel assist is lower than that of the automated driving;
switch between the automated driving and the travel assist;
in a case where an operation of a first switch by an occupant of the vehicle is accepted, perform the automated driving of the vehicle when the automated driving of the vehicle is performable and is not currently being performed, and perform the travel assist of the vehicle when the automated driving is not performable;
in a state where the travel assist is performable, perform travel assist which sets a current travel speed of the vehicle as a set speed of the vehicle in the travel assist when accepting the operation of the first switch, and perform travel assist which causes a travel speed of the vehicle to return to the set speed when accepting the operation of the first switch again after a predetermined cancel operation is performed; and
when a predetermined period of time has elapsed since it becomes possible to cause the travel speed of the vehicle in the travel assist to return to the set speed, or when the vehicle moves to a road of a different class from a road on which the vehicle is currently traveling in a state where it is possible to cause the travel speed of the vehicle in the travel assist to return to the set speed, cause returning to the set speed to be unperformable even if the operation of the first switch is accepted.

* * * * *